United States Patent [19]
Schmieder

[11] Patent Number: 5,927,796
[45] Date of Patent: Jul. 27, 1999

[54] MOTOR VEHICLE

[75] Inventor: Hansjörg Schmieder, Oberkirch-Zusenhofen, Germany

[73] Assignee: Progress-Werk Oberkirch AG, Oberkirch, Germany

[21] Appl. No.: 09/025,019

[22] Filed: Feb. 17, 1998

[30] Foreign Application Priority Data

Feb. 18, 1997 [DE] Germany .......................... 197 06 225

[51] Int. Cl.⁶ ..................................................... B60J 7/00
[52] U.S. Cl. .......................... 296/192; 296/188; 296/189; 296/194; 296/203.02; 296/205
[58] Field of Search ..................... 296/192, 188, 296/189, 194, 203.02, 205

[56] References Cited

U.S. PATENT DOCUMENTS

| | | | |
|---|---|---|---|
| 3,376,947 | 4/1968 | Barenyi et al. . | |
| 4,391,465 | 7/1983 | Piano | 296/192 |
| 4,432,565 | 2/1984 | Suzuki et al. . | |
| 4,440,435 | 4/1984 | Norlin | 296/194 |
| 4,466,654 | 8/1984 | Abe | 296/194 |
| 4,582,156 | 4/1986 | Kochy et al. . | |
| 4,591,202 | 5/1986 | Burk et al. | 296/192 |
| 4,597,461 | 7/1986 | Köchy et al. . | |
| 4,717,198 | 1/1988 | Komatsu | 296/194 |
| 4,789,198 | 12/1988 | Ide | 296/188 |
| 4,840,423 | 6/1989 | Maekawa | 296/194 |
| 5,011,201 | 4/1991 | Takahashi et al. | 296/203.02 |
| 5,354,114 | 10/1994 | Kelman et al. | 296/192 |
| 5,411,311 | 5/1995 | Shimmell et al. | 296/192 |

FOREIGN PATENT DOCUMENTS

| | | |
|---|---|---|
| 0055398 | 7/1982 | European Pat. Off. . |
| 3315646 | 10/1984 | Germany . |
| 4134436 | 4/1992 | Germany . |
| 59-140183 | 8/1984 | Japan . |

Primary Examiner—Joseph D. Pape
Assistant Examiner—Kiran Patel
Attorney, Agent, or Firm—Harness, Dickey & Pierce, P.L.C.

[57] ABSTRACT

In a motor vehicle having a spray shielding panel arranged below a windshield, having two A-columns and having a crossbeam which is arranged, running substantially horizontally, in front of said spray shielding panel between said A-columns, and having a support between said crossbeam and said spray shielding panel, by means of which said crossbeam is protected against buckling in the event of an impact, the support is configured in such a way that, in the installed state, said crossbeam and said spray shielding panel are not joined to one another in the region of said support, and are arranged at a distance of a few millimeters.

12 Claims, 7 Drawing Sheets

MOTOR VEHICLE

BACKGROUND OF THE INVENTION

1. Field of the Invention

The invention relates to a motor vehicle comprising a spray shielding panel arranged below a windshield, two A-pillars, and a crossbeam which is arranged, running substantially horizontally, in front of said spray shielding panel between said A-columns, and further comprising a support between said crossbeam and said spray shielding panel, by means of which said crossbeam is protected against buckling in the event of an impact.

2. Prior Art

A motor vehicle of this kind is commonly known. The crossbeam and the two A-columns are components of the body of the motor vehicle in the region of the windshield. The crossbeam is arranged between the two A-columns and is attached to them laterally by means of mounts provided on the crossbeam. The "A-columns" are understood to mean the two members, extending substantially vertically from the roof of the motor vehicle approximately to the floor of the body, between the upper sections of which the windshield is enclosed laterally, and on the lower sections of which are mounted, among other things, the front doors of the motor vehicle.

The crossbeam is arranged at a certain distance (a few centimeters) in front of the spray shielding panel. The spray shielding panel, which is arranged below the windshield, constitutes a partition between the engine compartment and passenger compartment of the motor vehicle.

Several different receiving elements are either welded or bolted on, or attached in some other manner, to the crossbeam. These receiving elements include mounts for the instrument panel, for the center console, for the steering column which carries the driver-side airbag, and for the passenger-side airbag.

One particularly important element of the motor vehicle cited initially is the support between the crossbeam and the spray shielding panel of the motor vehicle. This support is intended, in the event of a crash (or more precisely in the event of an impact on the motor vehicle in the direction of travel), for example in the event of a frontal collision, to prevent the crossbeam from buckling toward the spray shielding panel. For safety reasons, however, buckling of the crossbeam, in particular in the region of the mount for the driver-side or passenger-side airbag, must be prevented in the event of an impact, since in the event of buckling of the crossbeam, said mounts could be moved out of their defined position and the airbag or airbags would then open in a direction other than the intended direction. Provision of the support between the crossbeam and spray shielding panel prevents buckling of the crossbeam in the event of an accident, so that the mounts for the airbags maintain their defined positions and the airbags open in the correct position.

In the case of the commonly known motor vehicle cited initially, the support consists of a solid angle iron, welded or bolted onto the crossbeam in the region of the driver side or passenger side, the free arm of which is attached to the spray shielding panel. For this, there is provided in the free arm of the angle iron a pot-shaped opening, called the "gluepot," into which a hardening adhesive, for example a resin, is introduced, and into which a retaining bolt passing through the spray shielding panel is then inserted and, after the adhesive has cured, is permanently joined to the angle iron; or the angle iron is permanently bolt-mounted.

With this known type of support, the crossbeam is thus permanently joined to the spray shielding panel, after installation, in the region of the support.

This type of support is, however, disadvantageous if, for example, the instrument panel in the motor vehicle needs to be replaced. With present-day motor vehicles, in the event of a defect in an instrument of the instrument panel, it is usual for cost reasons to replace the entire module consisting of crossbeam and instrument panel, rather than replacing only the individual defective instrument. With the known configuration of the support, however, removal of the crossbeam together with the instrument panel is associated with considerable labor and requires the use of special tools, since in some cases the adhesive bond between the support secured to the crossbeam, and the spray shielding panel, must be undone if the support is not bolted but rather welded onto the crossbeam.

An even more serious disadvantage results when the replacement module, consisting of crossbeam and instrument panel, is installed. The manufacturing tolerances of the crossbeam plus instrument panel are generally a few millimeters. The result of these tolerances is that when the replacement crossbeam is installed, the position of the support previously attached to the crossbeam no longer coincides with the position at which the retaining bolt is guided through the spray shielding panel, but rather, in accordance with the tolerance, can deviate considerably from that position. The result is that the support can no longer be attached to the spray shielding panel. Attachment is, however, necessary with this known type of support, since otherwise vibrations would cause undesired noise which greatly impairs driving comfort. Manufacturing tolerances are also the reason why gluepots are provided in the known motor vehicles as the connection between the support and the spray shielding panel, since a threaded connection would result in complex mounts because of the component tolerances. Although consideration could be given, as a way to solve the problem, to accounting for manufacturing tolerances by correspondingly enlarging the gluepots, this is not regarded as satisfactory.

SUMMARY OF THE INVENTION

It is therefore an object of the invention to develop the motor vehicle of the type cited initially in such a way that the aforementioned disadvantages are eliminated, and that easy assembly and disassembly, independent of manufacturing tolerances, is made possible, such that at the same time, secure support of the crossbeam against the spray shielding panel in the event of an impact is guaranteed.

According to the invention the object is achieved, with regard to the motor vehicle cited initially, in that said support is configured in such a way that, in the installed state, said crossbeam and said spray shielding panel are not joined to one another in the region of said support, and are arranged at a distance of a few millimeters.

Because, in the motor vehicle according to the invention, the support is configured in such a way that, in the installed state, the crossbeam and the spray shielding panel are not joined to one another in the region of the support, a support that is contactless in the installed state is created. A contactless support of this kind has the advantage that the crossbeam is particularly easy to remove, since there is no need, as in the existing art, to undo a connection to the spray shielding panel. With the contactless support according to the invention, the gluepots of the prior art are not necessary. In addition, the contactless support allows easy assembly, and with the motor vehicle according to the invention even large tolerances in the unit consisting of crossbeam and instrument panel offer no difficulties, since the position of the support does not need to be exactly matched to the position of an attachment point on the spray shielding panel. Tolerances can therefore be ignored during installation. On the other hand, buckling of the crossbeam is still reliably prevented with the contactless support according to the invention, since the crossbeam can be deflected, at most, the distance of a few millimeters to the spray shielding panel, and is then securely supported against the spray shielding panel by the support. This slight deflection of the crossbeam does not influence the operating reliability of the airbag or airbags in an accident. Rather the latter are still in their predetermined location and alignment when the support becomes effective. Moreover, the distance of a few millimeters advantageously prevents the components arranged opposite one another in contactless fashion—the crossbeam, spray shielding panel, and support—from striking one another during vehicle operation due to body vibrations, thus eliminating undesired noise. As a result, the driving comfort of the motor vehicle according to the invention is not in any way impaired by the contactless support according to the invention.

In a preferred embodiment of the motor vehicle according to the invention, the distance is approximately 3 to 15 mm, preferably 5 to 10 mm.

This distance range is particularly advantageous because when this distance is selected, a reliable supporting effect is still achieved without allowing the crossbeam, in the event of an impact, to be deflected so far out of its original position that buckling occurs. On the other hand, these distances reliably prevent contact, due to vibrations in the resonance range of the body, among the mutually opposing components consisting of the crossbeam, spray shielding panel, and support.

In a further preferred embodiment, the support is constituted from a support element which is attached to the spray shielding panel.

The advantage of this feature is that the support constitutes a component which is independent of the crossbeam and of the elements and mounts attached thereto. Upon replacement of the crossbeam, the support can remain attached to the spray shielding panel, and does not need to be taken into account upon replacement of the crossbeam.

It is preferred in this context if the support element has a profile which is adapted, on its side facing the crossbeam, to the outer contour of the crossbeam.

This feature is particularly advantageous because in the event of an impact, the crossbeam can be supported in planar and/or positive form fit fashion by the support. In other words, the support element has a profile which is approximately complementary to the profile of the crossbeam. A conforming support moreover has the advantage that buckling of the crossbeam in a direction transverse to the direction of travel can also be prevented. With a tubular crossbeam having a round cross section, for example, the side of the support element supporting the crossbeam accordingly is rounded in complementary fashion.

In a further preferred embodiment, one or more tabs are configured on the crossbeam, and the support element comprises corresponding extensions which engage into the tabs in the event of a deflection of the crossbeam.

The advantage of this feature is that when the tabs are arranged correspondingly on the crossbeam, deflection and buckling of the crossbeam in a direction perpendicular to the direction of travel, i.e. upward or downward, can also be reliably prevented, thus further increasing the operating safety of the motor vehicle, in particular with regard to the mounts for the airbag or airbags.

In an alternative preferred embodiment, the support is constituted from a support element which is attached to the crossbeam.

This feature is advantageous when it is desired, for example for manufacturing reasons, to configure the support as a unit with the crossbeam.

In a further preferred exemplifying embodiment, the support is constituted from two elements, the first element being configured as a pot, and the second element being configured such that it can support itself in the pot.

With this exemplifying embodiment, a particularly advantageous contactless support of the crossbeam on the spray shielding panel is achieved. With appropriate configuration of the second support element that can support itself in the first support element configured as a pot, a conforming support can be achieved which prevents buckling of the crossbeam not only in a direction parallel to the direction of travel, but also in all directions perpendicular to the direction of travel. The second support element supporting itself in the pot is preferably configured so that effective support is achieved independently of the manufacturing tolerances of the crossbeam.

It is preferred in this context if the first support element is attached to the crossbeam, and the second support element to the spray shielding panel.

Consideration could also be given to a reversed arrangement of the two support elements.

It is further preferred in this context if the first support element and the second support element are configured in truncated conical shape.

This feature achieves the advantage that after even a slight penetration of the second support element into the first support element, configured as a pot, the support effect initiates by the fact that the second support element supports itself against the conical inner well of the first support element. In addition, the truncated conical shape of the support elements guarantees an installation that is independent of manufacturing tolerances.

In a further preferred exemplifying embodiment, the support is constituted from two support elements, the first support element having a flange section, and the second support element surrounding the flange section on all sides in contactless fashion in the manner of a housing.

This exemplifying embodiment represents an advantageous embodiment of the contactless support according to the invention which achieves the advantage that the crossbeam is supported not only against buckling in the direction toward the spray shielding panel, for example in a frontal collision, but also against buckling away from the spray shielding panel. Such buckling away from the spray shielding panel can occur, for example, if another vehicle strikes the motor vehicle from behind. Because the flange section is enclosed on all sides in the manner of a housing, deflection of the crossbeam away from the spray shielding panel is limited just as much as is a deflection toward the spray shielding panel. In addition, the fact of enclosure on all sides in the manner of a housing of course also limits deflections of the crossbeam transverse to the direction of travel, so that overall, buckling of the crossbeam in all spatial directions is prevented. As a result, the mount for the airbag is held in its original predetermined position in any accident.

It is preferred in this context if the first support element is attached to the spray shielding panel, and the second support element to the crossbeam.

This distribution of the support elements on the crossbeam and spray shielding member achieves the advantage that a replacement crossbeam is easy to install, since first the crossbeam, with the second housing-like support element attached thereto, is attached between the A-columns; and then the flange section of the first support element is inserted into the housing-like second support element and the second support element can then be attached to the spray shielding panel.

Further advantages are evident from the description below of the appended drawings.

It is understood that the features mentioned above and those yet to be explained below can be used not only in the respective combinations indicated, but also in other combinations or in isolation, without leaving the context of the present invention.

Exemplifying embodiments of the invention are described below with reference to the appended drawings, in which:

Figure 1:
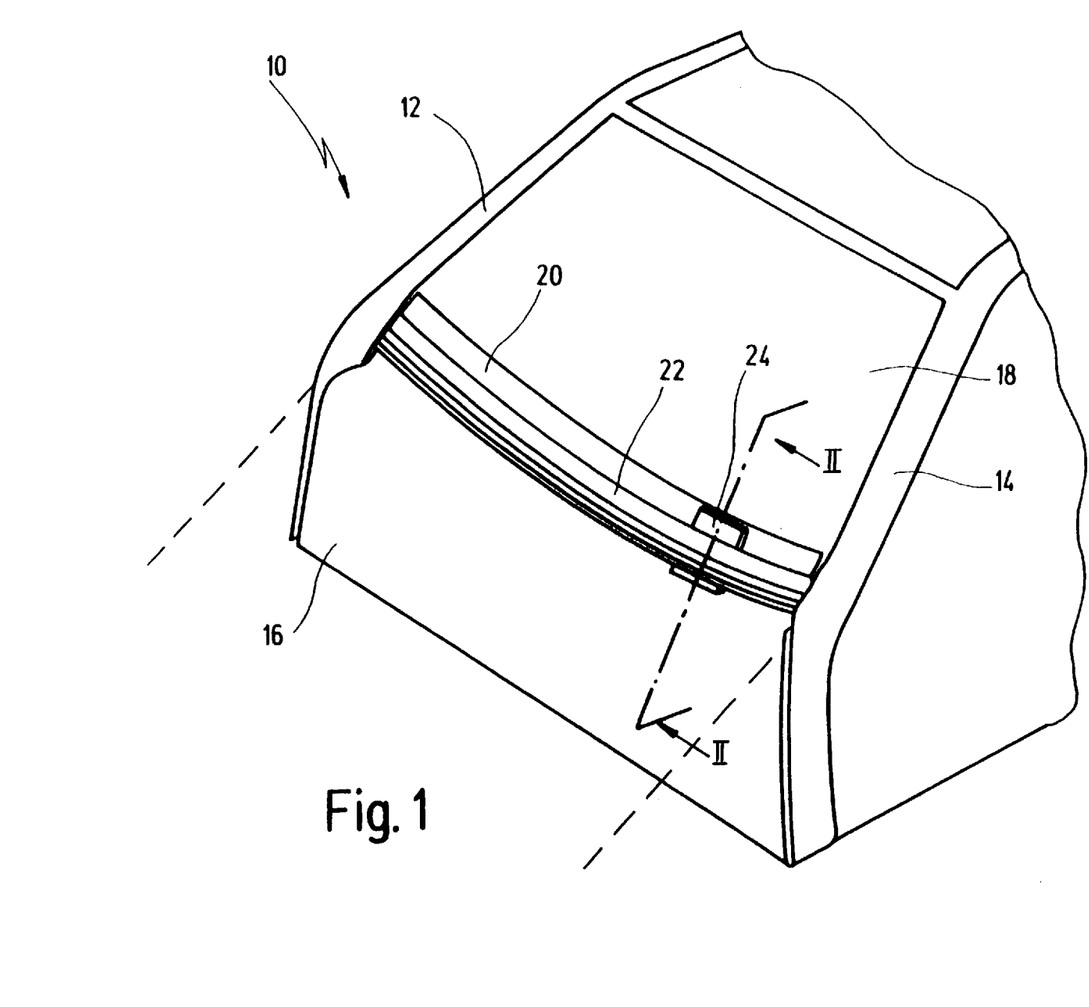
FIG. 1 shows a schematic partial view of a motor vehicle shown as a whole in FIG. 1a, in the region of the windshield, with a support for the crossbeam.
Figure 1A:
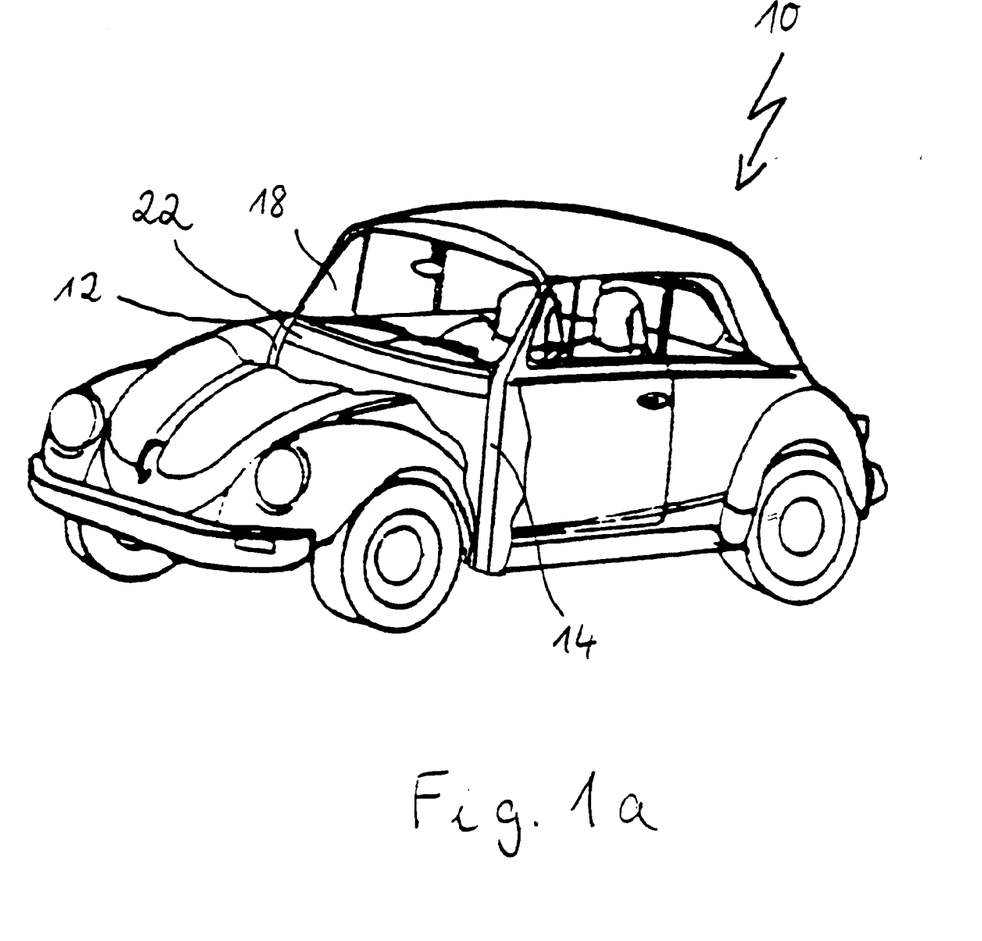
FIG. 1a shows the motor vehicle as a whole in a scale reduced by comparison with FIG. 1.

FIG. 1 depicts, schematically and partially, a motor vehicle designated with the general reference character 10. Motor vehicle 10 as a whole is shown in FIG. 1a. The portion of motor vehicle 10 depicted in FIG. 1 refers to the front end of the passenger compartment of motor vehicle 10. In this region, the body of motor vehicle 10 has right A-column 12 and left A-column 14. A-columns 12 and 14 constitute the two front vertically extending members of the supporting frame of the body of motor vehicle 10.

Motor vehicle 10 furthermore has a spray shielding panel 16 which is arranged below windshield 18. Spray shielding panel 16 separates the engine compartment, located in front of spray shielding panel 16, from the passenger compartment located behind spray shielding panel 16. Spray shielding panel 16 extends from the floor of the body to an upper end 20 from which windshield 18 continues thereabove.

A crossbeam 22 is arranged in front of spray shielding panel 16, extending horizontally between A-columns 12 and 14. Crossbeam 22 is attached laterally to A-columns 12 and 14. Crossbeam 22 is located at a distance of a few centimeters in front of spray shielding panel 16, and is not joined thereto.

Crossbeam 22 has the shape of a tube in FIG. 1, but crossbeam 22 can also have a rectangular or shell-shaped profile.

A support 24, which is depicted schematically here, is additionally provided over a portion of the length of the crossbeam between crossbeam 22 and spray shielding panel 16. Support 24 between crossbeam 22 and spray shielding panel 16 is contactless, i.e. in the installed state, crossbeam 22 and spray shielding panel 16 are not joined to one another even in the region of support 24, but rather are at a distance of a few millimeters from one another. Only in the event of an impact on motor vehicle 10 does support 24 become effective, in such a way that crossbeam 22 supports itself, by way of support 24, against spray shielding panel 16, thus preventing crossbeam 22 from buckling in the region of support 24. In FIG. 1, support 24 is arranged on the driver side, specifically in the region in which the mounts (not depicted in FIG. 1) for the driver-side airbag are attached to crossbeam 22. In the event of an impact, support 24 thus prevents crossbeam 22 from buckling in the region of the driver-side airbag and thereby moving the mounts for the airbag out of their positions in such a way that the airbag no longer opens in the correct position.

Although this is not depicted in FIG. 1, a support configured similarly or identically to support 24 can also be provided on the passenger side.

The configuration of support 24 will now be explained in more detail with reference to FIG. 2.

Support 24 is constituted from a support element 28 that is attached by means of foot sections 30 to spray shielding panel 16. Support element 28 can be either welded or bolted onto spray shielding panel 16.

Support element 28 has the overall shape of a box profile in which a peripheral section 32 is configured in trapezoidal or conical fashion. A side 34 of support element 28 which faces crossbeam 22 and constitutes the support surface is adapted to the outer contour of crossbeam 22. In FIG. 2, side 34 of support element 28 is configured in concave fashion and has the shape of a partial cylindrical periphery.

Figure 2:
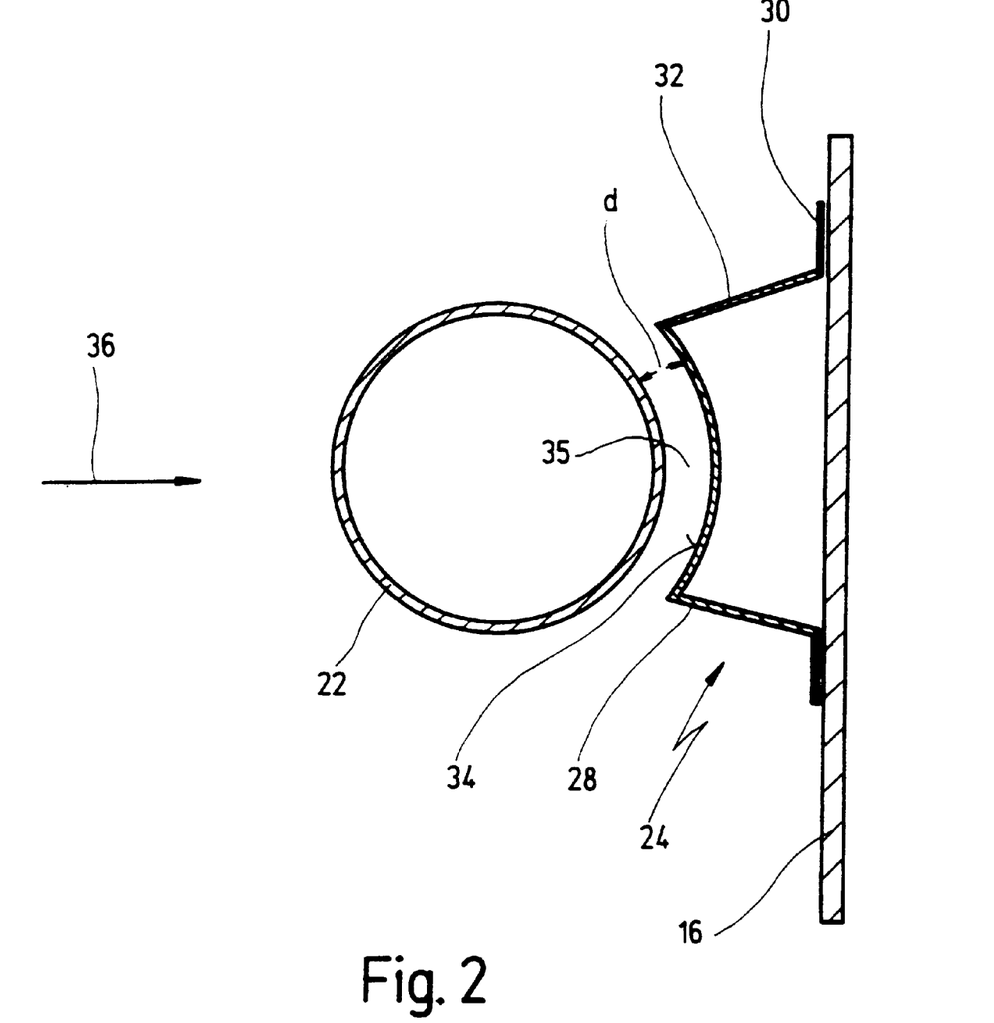
FIG. 2 shows a cross section along line II—II in FIG. 1, at a scale enlarged by comparison with FIG. 1.

With crossbeam 22 in the installed state depicted in FIG. 2, crossbeam 22 is arranged at a distance d from support element 28 which is approximately 5 to 10 mm. In other words, in the installed state crossbeam 22 and spray shielding panel 16 are not joined to one another, but rather a gap 35 remains open between crossbeam 22 and support 24. In the installed state, crossbeam 22 is thus supported in contactless fashion.

In the event of an impact on motor vehicle 10, for example a frontal collision with another motor vehicle, deformation forces act on crossbeam 22 in the direction of an arrow 36. As a result of the deformation forces, crossbeam 22 is deflected in the direction of arrow 36 against side 34, configured as a support surface, of support element 28, so that crossbeam 22 is then supported by support element 28, in planar and conforming fashion, on side 34 which is adapted to the outer contour of crossbeam 22. Support element 28 is configured in such solid fashion that it is essentially nondeformable, so that further deflection, and thus buckling, of crossbeam 22 is prevented. Support 24 thus becomes entirely effective after even a slight deflection (over distance d) of crossbeam 22.

In normal operation, gap 35 prevents undesired contact from occurring between crossbeam 22 and support element 28 resulting from resonant vibrations of the vehicle body and thus from vibrations of crossbeam 22 or spray shielding panel 16.

Figure 3:
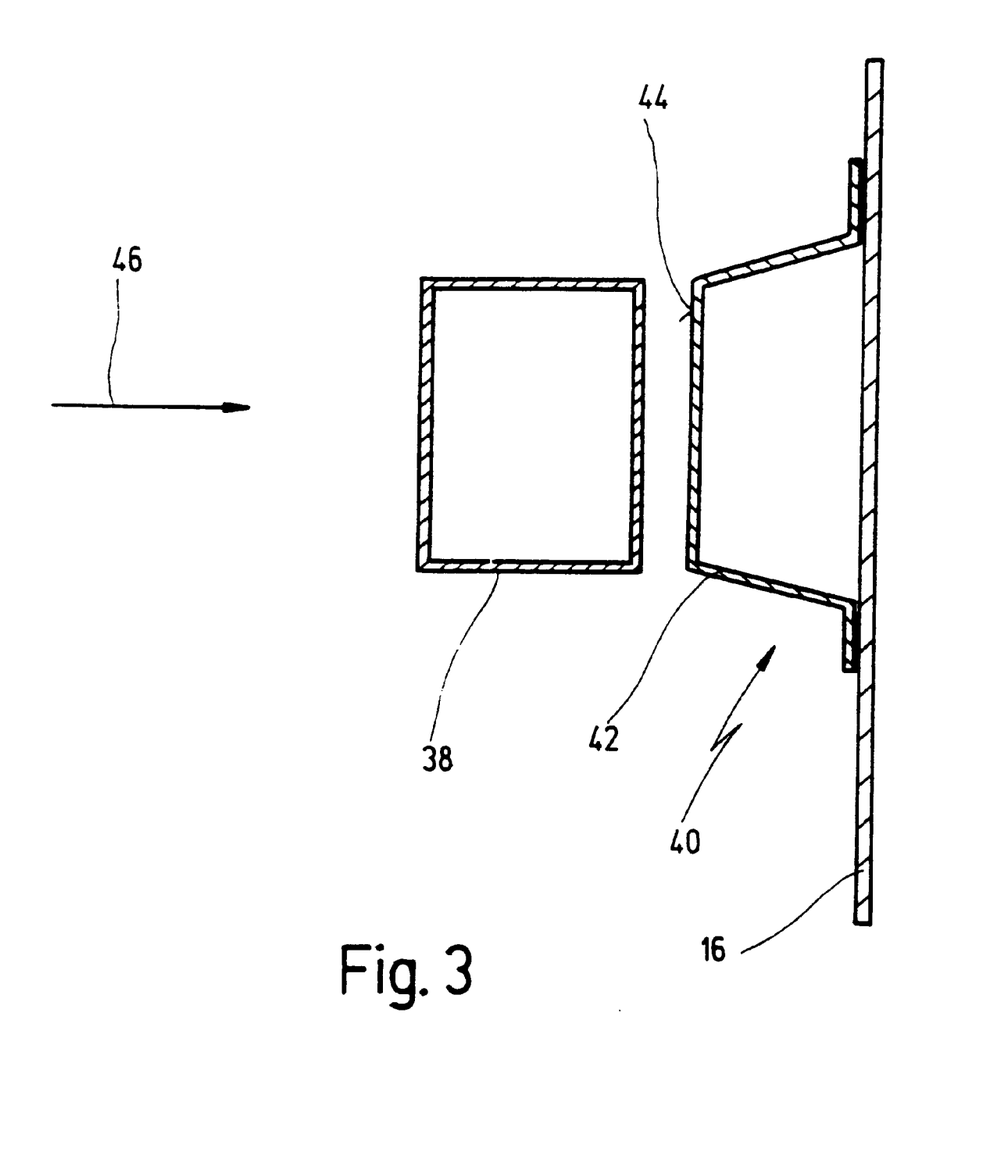
FIG. 3 shows a cross section, corresponding to FIG. 2, of a second exemplifying embodiment of the invention.

FIG. 3 schematically depicts an exemplifying embodiment similar to FIG. 2, in which a crossbeam 38 has a rectangular profile. A support 40 is constituted from a support element 42 whose side 44 facing crossbeam 38 is configured as a flat surface. With this configuration as well, crossbeam 38 is supported in planar fashion against support element 42 in the event of a deflection in the direction of an arrow 46. Crossbeam 38 is once again arranged at a distance of a few millimeters from support element 42.

Figure 4:
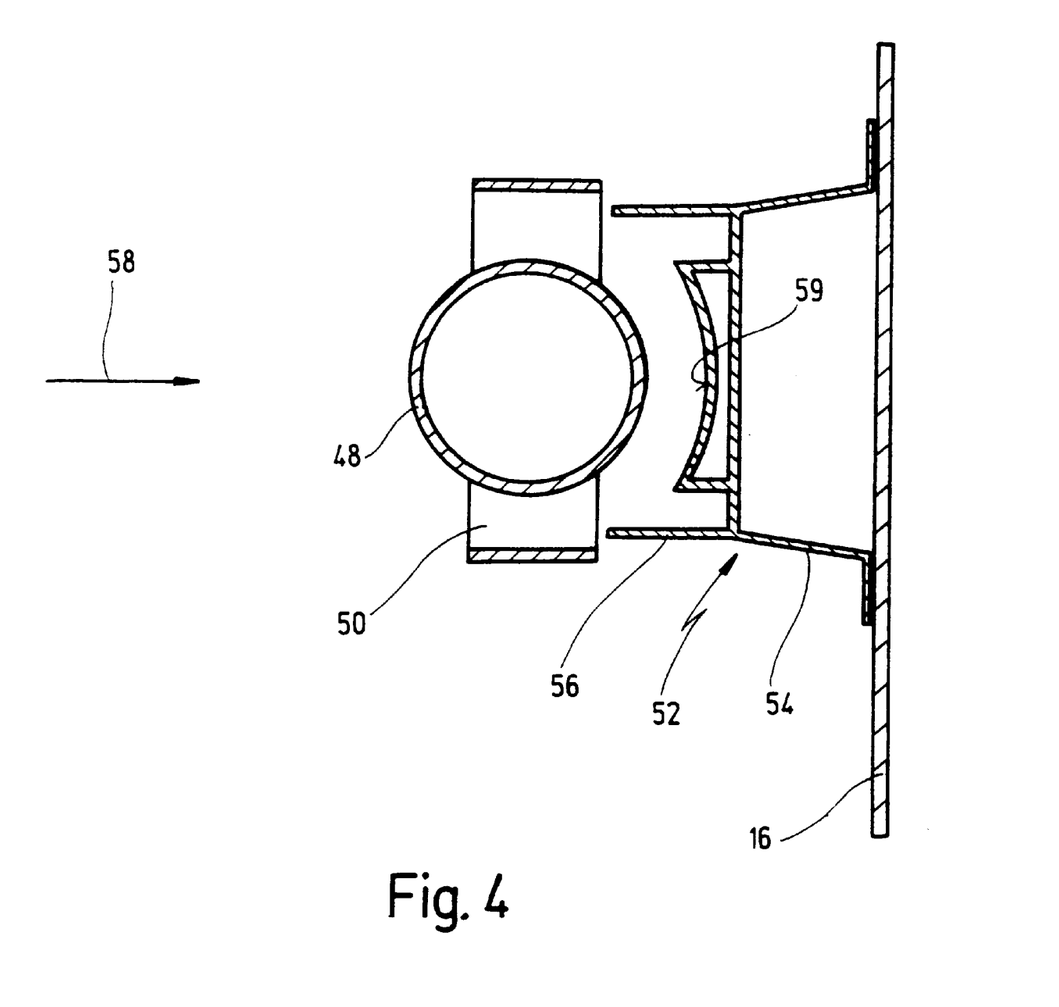
FIG. 4 shows a cross section, corresponding to FIG. 2, of a third exemplifying embodiment of the invention.

FIG. 4 depicts a further exemplifying embodiment in which a substantially tubular crossbeam 48 has two tabs 50 in the form of a C-shaped profile. Tabs 50 are attached opposite one another at the top and bottom of crossbeam 48.

A support 52 is configured from a support element 54 which is attached to spray shielding panel 16. Support element 54 has extensions 56 which, when crossbeam 48 is installed, are arranged outside tabs 50 adjacent thereto. In the event of a deflection of crossbeam 48 in the direction of an arrow 58, tabs 50 move over extensions 56, which then engage into tabs 50. As soon as extensions 56 engage into tabs 50, crossbeam 48 cannot buckle either in the direction of arrow 58 or in a direction transverse to arrow 58. In addition, a side 59 of support 54 which constitutes a support surface is adapted to the outer contour of crossbeam 48 so that crossbeam 48 can be supported in planar and conforming fashion against support element 54.

In the installed state as depicted in FIG. 4, crossbeam 22 is once again arranged at a distance of a few millimeters from the support surface.

Figure 5:
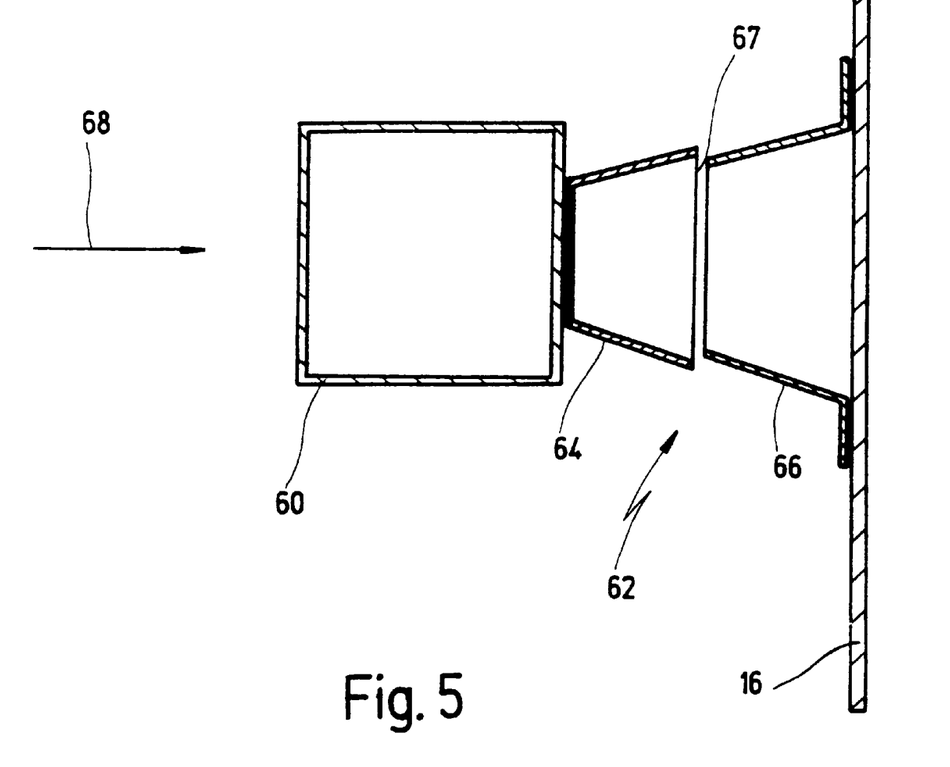
FIG. 5 shows a cross section, corresponding to FIG. 2, of a fourth exemplifying embodiment of the invention.

In the exemplifying embodiment depicted in FIG. 5, motor vehicle 10 has a crossbeam 60 having a rectangular profile. In addition, a support 62 is provided which is constituted from a first support element 64 and a second support element 66. First support element 64 is attached to crossbeam 60 and configured as a pot of truncated conical shape.

Second support element 66 is attached to spray shielding panel 16 and is arranged, in the installed state depicted in FIG. 5, adjacent to one open side 67 of first support element 64. Support 62 is thus also contactless in the installed state. Second support element 66, also configured in the shape of a truncated cone, has at its end adjacent to the first support element an outside diameter which is somewhat smaller than the inside diameter of open side 67 of first support element 64.

In the event of a deflection of crossbeam 60 in the direction of an arrow 68, the pot-shaped first support element 56 moves over second support element 66 and is supported on its outer wall; in addition, the outer wall of second support element 66 is optionally supported against the inner wall of first support element 64. Manufacturing tolerances of crossbeam 60 are compensated for by the truncated conical configuration of first support element 64 and of second support element 66, so that even after crossbeam 60 has been replaced by a new one, the effectiveness of support 62 is not impaired.

Figure 6:
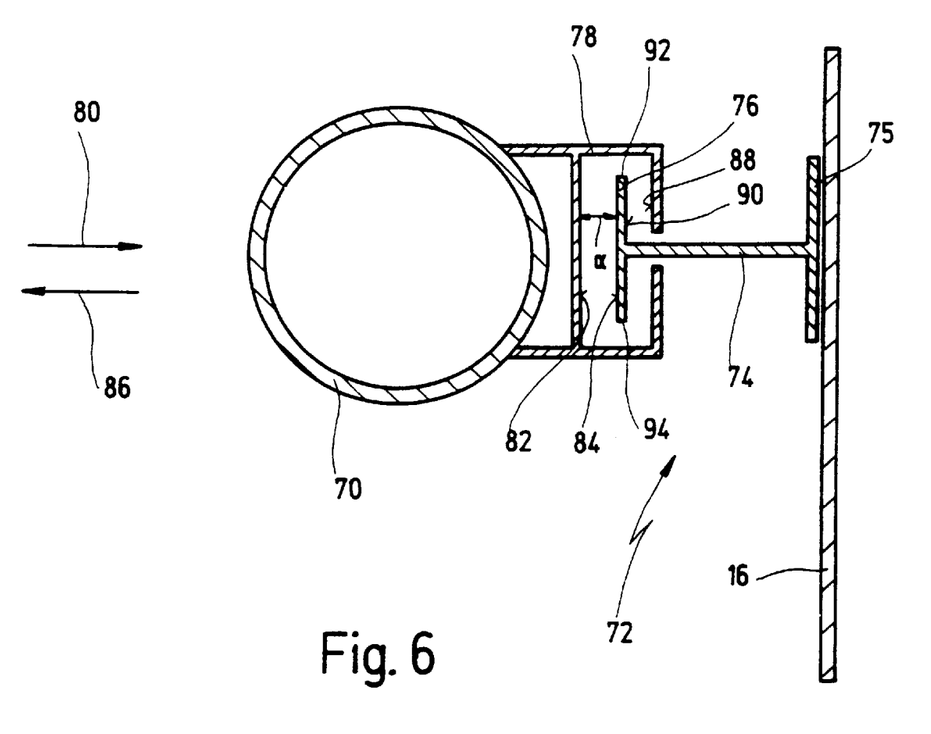
FIG. 6 shows a cross section, corresponding to FIG. 2, of a fifth exemplifying embodiment of the invention.

FIG. 6 depicts a final exemplifying embodiment in which a tubular crossbeam 70 is supported in contactless fashion against spray shielding panel 16 via a support 72. Support 72 has a first support element 74 in the form of a double-T profile that is removably attached with a foot flange 75 to spray shielding panel 16 by bolting or in another manner. First support element 74 has at its free end a flange section 76 which is received in a second housing-like support element 78 which is attached to crossbeam 70. Second support 78 surrounds flange section 76 on all sides, flange section 76 being received approximately centeredly in second support element 78. In other words, flange section 76 is on all sides at a distance d, which in the foregoing exemplifying embodiments is approximately 5 to 10 mm, from the inner walls of second support 78.

In the event of a deflection of crossbeam 70 in the direction of an arrow 80, i.e. in the event of a deflection of crossbeam 70 toward spray shielding panel 16, a surface 82 of second support element 78 is supported against a support surface 84 of flange section 76, as a result of which, as in the case of the previous exemplifying embodiments, buckling of crossbeam 70 in the direction of spray shielding panel 16 is prevented.

But also deflection of crossbeam 70 in the direction of an arrow 86 is limited by the fact that in the event of such a deflection, a surface 88 of second support element 78 is supported against a support surface 90 of flange section 76. This prevents crossbeam 70 from buckling in the direction of arrow 86 in the event of a deformation force acting on crossbeam 70 in the direction of arrow 86.

As is also evident from FIG. 6, deflection of the crossbeam transverse to directions 80 and 86 is also limited by the fact that flange section 76 is also surrounded at its free ends 92 and 94 by second support element 78.

Support 72 thus prevents buckling of crossbeam 70 in all spatial directions.

In all of the exemplifying embodiments depicted in FIGS. 1 and 6, there is provided for the crossbeam a support which, in the event of replacement of the crossbeam together with the instrument panels attached thereto, allows easy installation and removal of the crossbeam regardless of any tolerances, and nevertheless guarantees secure support of the crossbeam against the spray shielding panel.

What is claimed is:

1. A motor vehicle, comprising
 a windshield,
 a spray shielding panel disposed below said windshield,
 two A-columns disposed on opposite sides of said windshield, respectively, and extending substantially vertically,
 a crossbeam disposed in front of said spray shielding panel between said A-columns, said crossbeam extending substantially horizontally, opposite ends of said crossbeam connected to said two A-columns, respectively,
 a support disposed between said crossbeam and said spray shielding panel, by means of which support said crossbeam is protected against buckling in the event of an impact,
 wherein said support is configured in that said crossbeam and said spray shielding panel are disposed at a certain distance of a few millimeters in the region of said support in a contactless manner.

2. The motor vehicle of claim 1, wherein said distance is approximately 3 to 15 mm.

3. The motor vehicle of claim 1, wherein said distance is approximately 5 to 10 mm.

4. The motor vehicle of claim 1, wherein said support is constituted from a support element which is attached to said spray shielding panel.

5. The motor vehicle of claim 4, wherein said support element has a profile which is adapted, on its side facing said crossbeam, to the outer contour of the crossbeam.

6. The motor vehicle of claim 5, wherein at least one tab is configured on said crossbeam, and said support element comprises corresponding extensions which engage into the tabs in the event of a deflection of said crossbeam.

7. The motor vehicle of claim 1, wherein said support is constituted from a support element which is attached to said crossbeam.

8. The motor vehicle of claim 1, wherein said support is constituted from two support elements, the first support element being configured as a pot, and the second support element being configured such that it can support itself in said pot.

9. The motor vehicle of claim 8, wherein said first support element is attached to said crossbeam, and said second support element to said spray shielding panel.

10. The motor vehicle of claim 1, wherein said support is constituted from two support elements, the first support element being configured as a pot, and the second support element being configured such that it can support itself in said pot and said first support element and said second support element are configured in truncated conical shape.

11. The motor vehicle of claim 1, wherein said support is constituted from two support elements, the first support element having a flange section, and the second support element surrounding said flange section on all sides in contactless fashion in the manner of a housing.

12. The motor vehicle of claim 11, wherein said first support element is attached to said spray shielding panel, and said second support element to said crossbeam.

* * * * *